(12) United States Patent
Yang et al.

(10) Patent No.: US 9,436,550 B2
(45) Date of Patent: Sep. 6, 2016

(54) SYSTEMS AND METHODS FOR INTERNAL DISK DRIVE DATA COMPRESSION

(71) Applicant: LSI Corporation, San Jose, CA (US)

(72) Inventors: Shaohua Yang, San Jose, CA (US); Ebad Ahmed, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 90 days.

(21) Appl. No.: 14/082,261

(22) Filed: Nov. 18, 2013

(65) Prior Publication Data

US 2015/0121173 A1    Apr. 30, 2015

Related U.S. Application Data

(60) Provisional application No. 61/898,420, filed on Oct. 31, 2013.

(51) Int. Cl.
    G11C 29/00    (2006.01)
    G06F 11/10    (2006.01)

(52) U.S. Cl.
    CPC ......... G06F 11/108 (2013.01); G06F 11/1076 (2013.01); G06F 2211/1009 (2013.01)

(58) Field of Classification Search
    None
    See application file for complete search history.

(56) References Cited

U.S. PATENT DOCUMENTS

| | | |
|---|---|---|
| 5,222,069 A | 6/1993 | Chevalley |
| 5,731,922 A | 3/1998 | Yamasaki |
| 5,938,790 A | 8/1999 | Marrow |
| 6,029,264 A | 2/2000 | Kobayashi |
| 6,272,659 B1 | 8/2001 | Zook |
| 6,438,724 B1 | 8/2002 | Cox |
| 6,446,234 B1 | 9/2002 | Cox |
| 6,493,846 B1 | 12/2002 | Kondo |
| 6,694,477 B1 | 2/2004 | Lee |
| 6,810,094 B1 | 10/2004 | Lu |
| 6,847,601 B2 | 1/2005 | Kanai |
| 7,178,086 B2 | 2/2007 | Hassner |
| 7,395,491 B2 | 7/2008 | Chen |
| 7,685,497 B2 | 3/2010 | Kons |
| 8,230,292 B2 | 7/2012 | Fujiwara |
| 8,949,704 B2 * | 2/2015 | Zhang et al. ................. 714/810 |
| 2005/0166132 A1 | 7/2005 | Shen et al. |
| 2006/0080589 A1 * | 4/2006 | Holm et al. ................. 714/763 |
| 2007/0201632 A1 | 8/2007 | Ionescu |
| 2008/0034272 A1 * | 2/2008 | Wu et al. ...................... 714/763 |
| 2008/0195810 A1 * | 8/2008 | Wu et al. ...................... 711/114 |
| 2010/0042890 A1 | 2/2010 | Gunnam et al. |

(Continued)

FOREIGN PATENT DOCUMENTS

JP    06046406    2/1994

OTHER PUBLICATIONS

Kang et al., "A Two-Stage Iterative Decoding of LDPC Codes for Lowering Error Floors", IEEE GLOBECOM Proceedings, 1088-1091 (2008).

(Continued)

Primary Examiner — Daniel McMahon

(57) ABSTRACT

The present invention is related to systems and methods for data storage compression. As an example, a system is discussed that includes a semiconductor device having a host interface, a compression circuit operable to compress a write data set received via the host interface, and a write channel circuit operable to apply an encoding algorithm to the compressed data set to yield an encoded data set.

18 Claims, 5 Drawing Sheets

(56) References Cited

U.S. PATENT DOCUMENTS

| | | |
|---|---|---|
| 2010/0287436 A1 | 11/2010 | Lastras-Montano |
| 2011/0109773 A1 | 5/2011 | Dekel |
| 2011/0161774 A1* | 6/2011 | Shin et al. .................... 714/755 |
| 2011/0164745 A1 | 7/2011 | Marzetta et al. |
| 2012/0005551 A1 | 1/2012 | Gunnam et al. |
| 2012/0166752 A1* | 6/2012 | Taniyama ............. G06F 3/0686 711/170 |
| 2012/0288003 A1 | 11/2012 | Do et al. |
| 2013/0007570 A1 | 1/2013 | Seago |
| 2013/0024163 A1 | 1/2013 | Xia |
| 2013/0086446 A1 | 4/2013 | Yeung et al. |
| 2013/0246877 A1* | 9/2013 | Zhang et al. ................. 714/752 |
| 2013/0254616 A1* | 9/2013 | Yang ............................. 714/752 |
| 2013/0326307 A1* | 12/2013 | Cideciyan et al. ........... 714/756 |
| 2014/0055881 A1* | 2/2014 | Zaharris ......................... 360/55 |

OTHER PUBLICATIONS

Lin et al "An efficient VLSI Architecture for non binary LDPC decoders"—IEEE Transaction on Circuits and Systems II vol. 57, Issue 1 (Jan. 2010) pp. 51-55.

Perisa et al "Frequency Offset Estimation Based on Phase Offsets Between Sample Correlations" Dept. of Info. Tech. University of Ulm 2005.

U.S. Appl. No. 14/025,356, Unpublished (filed Sep. 12, 2013) (Nayak Ratnakar Aravind).

U.S. Appl. No. 14/025,468, Unpublished (filed Sep. 12, 2013) (Shaohua Yang).

U.S. Appl. No. 13/654,417, Unpublished (filed Oct. 18, 2012) (Fan Zhang).

U.S. Appl. No. 13/766,857, Unpublished (filed Feb. 14, 2013) (Shaohua Yang).

U.S. Appl. No. 13/707,898, Unpublished (filed Dec. 7, 2012) (Razmik Karabed).

U.S. Appl. No. 13/426,722, Unpublished (filed Mar. 22, 2012) (Fan Zhang).

U.S. Appl. No. 13/452,733, Unpublished (filed Apr. 20, 2012) (Shaohua Yang).

U.S. Appl. No. 13/450,289, Unpublished (filed Apr. 18, 2012) (Shaohua Yang).

U.S. Appl. No. 13/284,754, Unpublished (filed Oct. 28, 2011) (Fan Zhang).

U.S. Appl. No. 13/363,751, Unpublished (filed Feb. 1, 2012) (Lei Chen).

* cited by examiner

SYSTEMS AND METHODS FOR INTERNAL DISK DRIVE DATA COMPRESSION

CROSS REFERENCE TO RELATED APPLICATIONS

The present application claims priority to (is a non-provisional of) U.S. Pat. App. No. 61/898,420 entitled "Systems and Methods for Internal Disk Drive Data Compression", and filed Oct. 31, 2013 by Yang et al. The entirety of the aforementioned provisional patent application is incorporated herein by reference for all purposes.

BACKGROUND OF THE INVENTION

The present invention is related to systems and methods for data storage compression.

Various data transfer systems have been developed including storage systems where data is transferred to and from a magnetic storage medium. This data may be compressed at the host to reduce the volume of data that must be transferred and maintained on the storage medium. Such host side compression can become a bottleneck that reduces data throughput.

Hence, for at least the aforementioned reasons, there exists a need in the art for advanced systems and methods for data compression.

BRIEF SUMMARY OF THE INVENTION

The present invention is related to systems and methods for data storage compression.

Various embodiments of the present invention provide data storage systems that include: a semiconductor device, and a magnetic storage medium. The semiconductor device includes: a host interface circuit operable to receive a write command from a host device that includes a write data set; a compression circuit operable to compress the write data set to yield a compressed data set; and a write channel circuit operable to apply an encoding algorithm to the compressed data set to yield an encoded data set. The magnetic storage medium is operable to store a magnetic signal corresponding to the encoded data set.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
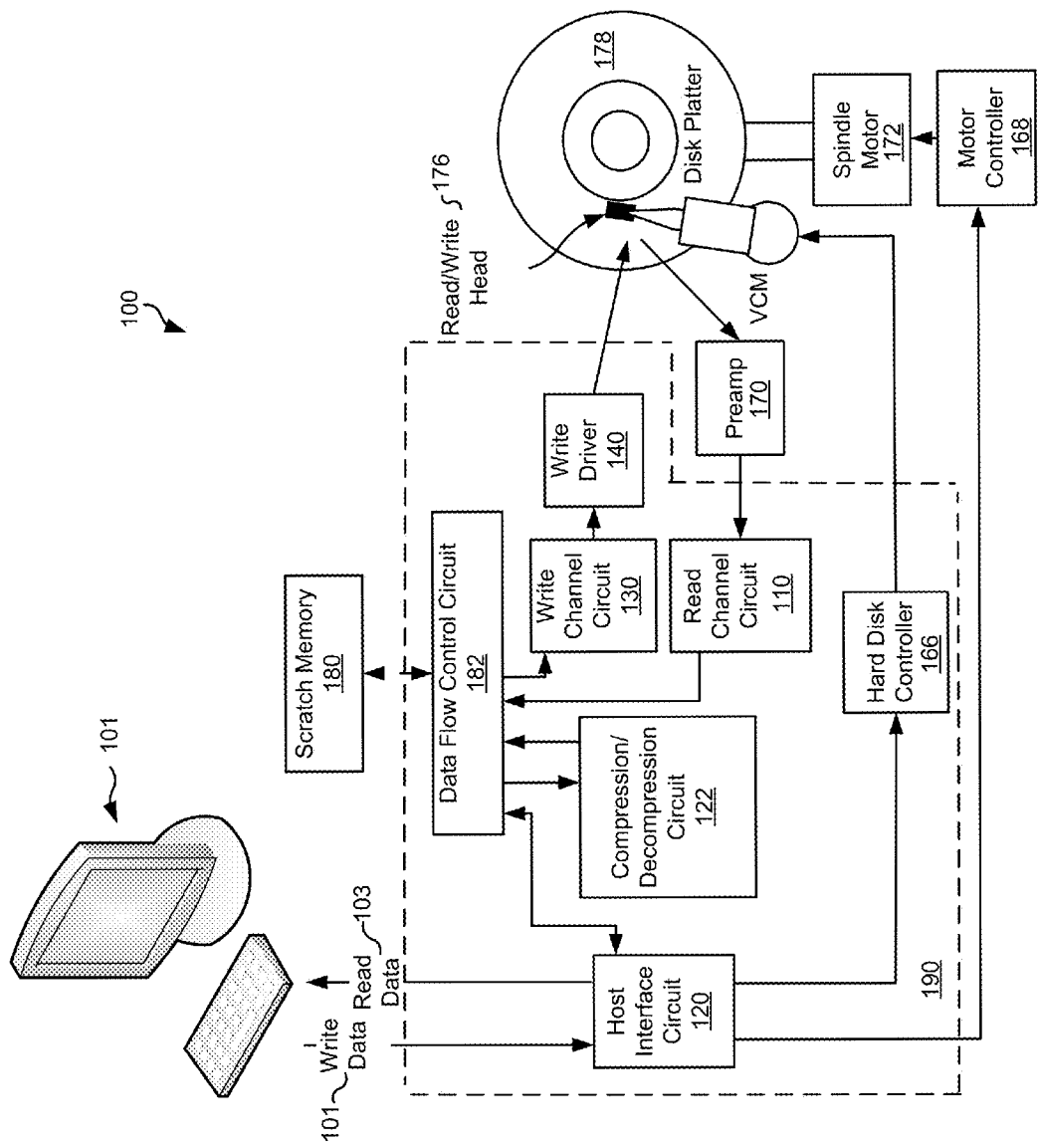
FIG. 1 depicts a data storage system including internal data compression/decompression relying on a scratch memory in accordance with some embodiments of the present invention.

The present invention is related to systems and methods for data storage compression.

Various embodiments of the present invention provide data storage systems that include: a semiconductor device, and a magnetic storage medium. The semiconductor device includes: a host interface circuit operable to receive a write command from a host device that includes a write data set; a compression circuit operable to compress the write data set to yield a compressed data set; and a write channel circuit operable to apply an encoding algorithm to the compressed data set to yield an encoded data set. The magnetic storage medium is operable to store a magnetic signal corresponding to the encoded data set.

In some instances of the aforementioned embodiments, the systems further include a solid state memory device operable to store the write data set, and to transfer the write data set to the compression circuit. In some cases the solid state memory device is a random access memory device. In various instances, the systems further include a data flow control circuit operable to cause the write data set to be stored to the solid state memory device, and to access the write data set from the solid state memory device and provide the write data set to the compression circuit. In some such instances, the data flow control circuit is further operable to: cause the write data set to be stored to the magnetic storage medium; and access the write data set from the magnetic storage medium when the magnetic storage medium exhibits insubstantial usage. In one or more cases, the encoded data set is a compressed, encoded data set; and causing the write data set to be stored to the magnetic storage medium includes: applying the data encoding algorithm to the write data set to yield a non-compressed, encoded data set; and storing the non-compressed, encoded data set to the magnetic storage medium. In particular cases, accessing the write data set from the magnetic storage medium when the magnetic storage medium exhibits insubstantial usage includes applying a data decoding algorithm to the non-compressed encoded data set to yield the write data set.

Other embodiments of the present invention provide methods for storing data in a hard disk drive. The methods include: providing a magnetic storage medium; providing a solid state memory; receiving a received write data set; storing the received write data set to the solid state memory as a stored write data set; accessing the stored write data set from the solid state memory as an accessed write data set; applying a compression algorithm to the accessed write data set to yield a compressed data set; encoding the compressed data set to yield an encoded data set; and store the encoded data set to the magnetic storage medium. In some cases, the solid state memory device is a random access memory device and the magnetic storage medium is a disk platter of a hard disk drive.

In various instances of the aforementioned embodiments, the methods further include: storing the received write data set to the magnetic storage medium; and retrieving the write data set from the magnetic storage medium prior to storing the received write data set to the solid state memory as the stored write data set. In one particular case where the encoded data set is a compressed, encoded data set, storing the received write data set to the magnetic storage medium includes: encoding the received write data set to yield a non a non-compressed, encoded data set; and storing the non-compressed, encoded data set to the magnetic storage medium. In some cases, accessing the write data set from the magnetic storage medium when the magnetic storage medium exhibits insubstantial usage includes: applying a data decoding algorithm to the non-compressed encoded data set to recover the received write data set.

Yet other embodiments of the present invention provide storage devices. Such storage devices include: a solid state memory device, a semiconductor device, a magnetic storage medium, and a read write head. The semiconductor device includes: a host interface circuit operable to receive a write command from a host device, wherein the write command includes a write data set; a compression circuit operable to compress the write data set to yield a compressed data set; a data flow control circuit operable to cause the write data set to be stored to the solid state memory device, and to access the write data set from the solid state memory device and provide the write data set to the compression circuit; and a write channel circuit operable to apply an encoding algorithm to the compressed data set to yield an encoded data set. The read/write head is disposed in relation to the magnetic storage medium, and is operable to magnetize the storage medium with a signal corresponding to the encoded data set. In some instances of the aforementioned embodiments, the encoded data set is a compressed, encoded data set, and the data flow control circuit is further operable to: apply the data encoding algorithm to the write data set to yield a non-compressed, encoded data set; store the non-compressed, encoded data set to the magnetic storage medium; access the non-compressed, encoded data set from the magnetic storage medium; and apply a data decoding algorithm to the non-compressed encoded data set to yield the write data set.

Turning to FIG. 1, a data storage system 100 including internal data compression/decompression relying on a scratch memory is shown in accordance with some embodiments of the present invention. Data storage system 100 includes a data control circuit 190, a scratch memory 180, and a magnetic storage medium 178 and associated control circuitry (shown as a disk platter). Data storage system 100 is accessible using, for example, a computer 101 via a host interface 120. It should be noted that computer 101 may be any device known in the art that is capable of providing data for storage and for requesting data that was previously stored.

The control circuitry associated with magnetic storage medium 178 includes a motor controller 168 and a spindle motor 172. In operation, a data request (read or write) is received by host interface 120. Host interface circuit 120 controls addressing and timing of data to/from magnetic storage medium 178. The data on magnetic storage medium 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In response to a read request received from computer 101, host interface 120 provides a control signal to a hard disk controller 166 and a control signal to motor controller 168. Hard disk controller 166 positions read/write head assembly 176 in relation to magnetic storage medium 178. Motor controller 168 drives spindle motor 172 to spin magnetic storage medium at a determined spin rate (RPMs). Once read/write head assembly 176 is positioned adjacent the proper data track, magnetic signals representing data on magnetic storage medium 178 are sensed at locations corresponding by read/write head assembly 176 as storage medium 178 is rotated by spindle motor 172. The sensed magnetic signals are provided as continuous, minute analog signals representative of the magnetic data on magnetic storage medium 178. These minute analog signals are transferred from read/write head assembly 176 to data control circuit 190 via a preamplifier 170. Preamplifier 170 is operable to amplify the minute analog signals accessed from magnetic storage medium 178.

In addition, to host interface circuit 120, data control circuit 190 includes a data flow control circuit 182, a compression/decompression circuit 122, a write channel circuit 130, a write driver 140, and a read channel circuit 110. During a read operation triggered by a read request from computer 101 to host interface circuit 120, data sensed from magnetic storage medium 178 is delivered to read channel circuit 110 via preamplifier 170. Read channel circuit 110 applies a data decoding algorithm to the received data to yield compressed data. Read channel circuit 110 may be any read channel circuit known in the art. In one particular embodiment of the present invention, read channel circuit includes a data detector circuit and a data decoder circuit each communicably coupled via a central memory. In one such embodiment of the present invention, the data detector circuit is a maximum a posteriori data detector circuit that applies a data detection algorithm to the data received via preamplifier 170 to yield a detected output. The detected output is stored to the central memory. The data decoder circuit may be, for example, a low density parity check decoder circuit. The data decoder circuit applies a data decode algorithm to the detected output to yield a compressed data set.

Host interface circuit 120 provides a command to data flow control circuit 182 that governs the flow of data through the various circuitry of data control circuit 190. In particular, data flow control circuit 182 directs the storage of the compressed data from read channel circuit 110 in scratch memory 180. In some embodiments of the present invention, scratch memory 180 is a solid state memory device. In one particular case, scratch memory 180 is a DDR SDRAM. Data flow control circuit 182 awaits a signal from compression/decompression circuit 122 indicating availability of compression/decompression circuit 122. When compression/decompression circuit 122 becomes available, data flow control circuit 182 accesses the compressed data previously stored to scratch memory 180 and provides it to compression/decompression circuit 122.

Compression/decompression circuit 122 may apply any compression/decompression algorithm known in the art. Compression/decompression circuit 122 applies a decompression algorithm to the compressed data to yield read data. This read data is the data that was originally received from computer 101 to be written to magnetic storage medium 178. Data flow control circuit 182 directs storage of the read data from compression/decompression circuit 122 back to scratch memory 180 where it awaits transfer to computer 101 via host interface circuit 120. In particular, when host interface circuit 120 signals data flow control circuit 182 indicating that there is bandwidth available to transfer the previously stored read data, data flow control circuit 182 causes the previously stored read data to be accessed from scratch memory 180 and provided as read data 103 to computer 101.

In response to a write request received from computer 101, host interface 120 provides a control signal to hard disk controller 166 and a control signal to motor controller 168. Hard disk controller 166 positions read/write head assembly 176 in relation to magnetic storage medium 178. Motor controller 168 drives spindle motor 172 to spin magnetic storage medium at a determined spin rate (RPMs). Once read/write head assembly 176 is positioned adjacent the proper data track, signals representing data to be stored on magnetic storage medium 178 are provided to read/write head assembly 176 by data control circuit 190 which writes the data as magnetic signals on magnetic storage medium 178.

During a write operation triggered by a write request from computer 101 to host interface circuit 120, write data 101 is provided from computer 101 to host interface circuit 120. Data flow control circuit 182 directs storage of the received write data to scratch memory 180. Data flow control circuit 182 awaits a signal from compression/decompression circuit 122 indicating availability of compression/decompression circuit 122. When compression/decompression circuit 122 becomes available, data flow control circuit 182 accesses the write data previously stored to scratch memory 180 and provides it to compression/decompression circuit 122.

Compression/decompression circuit 122 applies a compression algorithm to the write data to yield compressed data. Data flow control circuit 182 directs storage of the compressed data from compression/decompression circuit 122 back to scratch memory 180 where it awaits transfer to write channel circuit 130. Data flow control circuit 182 awaits the availability of the write channel (i.e., the combination of write channel circuit 130, write driver 140, and read/write head 176). When the write channel becomes available, data flow control circuit 182 accesses the compressed data from scratch memory 180 and provides the accessed data to write channel circuit 130. As part of this process, data flow control circuit 182 causes the stored, compressed data to be re-assembled to a fixed format size according to the magnetic data format granularity of magnetic storage medium 178.

In turn, write channel circuit 130 applies a data encoding algorithm to the received compressed data to yield an encoded output. In some embodiments of the present invention, the encoding algorithm is low density parity check encoding algorithm. The resulting encoded output is formatted as codewords provided to write driver 140. Write driver 140 may be any circuit known in the art that is capable of formatting or preparing a received codeword for transfer to read/write head assembly 176. In addition, write driver 140 creates and maintains a log entry linking the logical block address of the un-compressed data (i.e., the original host data) to the physical block address on magnetic storage medium 178 to which the encoded, compressed data is stored. This linking data is provided to hard disk controller 166 where it is used to direct access to the stored, compressed data based upon the logical block address provided by the requesting host. In turn, read/write head 176 magnetizes magnetic storage medium 178 to represent the encoded data. Of note, by performing the compression internal to data control circuit 190 (i.e., between host interface circuit 120 and write channel circuit 130, a bottleneck is not created between computer 101 and the size of codewords stored to magnetic storage medium 178 does not vary due to compression.

It should be noted that in some embodiments multiple compressed data sets are re-grouped together into data set sizes that match the sizes (e.g., 4 KB) accommodated by magnetic storage medium 178. In some cases, data may be marked as non-compressible using a single format bit. In such a case, the data is not compressed or de-compressed. Even if data is not compressible, it may be split across multiple physical sectors due to the re-grouping process applied to compressed data. Setting the single format bit the opposite direction indicates that the data is compressible and will be subjected to the compression and decompression discussed above. Further, it should be noted that data storage system 100 may be operated consistent with any of the methods discussed below in relation to FIGS. 2a-2b, 3 and 4 depending upon the particular implementation.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include additional solid state memories that may be used in parallel to magnetic storage medium 178 to provide additional storage. In such a case, the solid state memory receives and provides information directly to read channel circuit 110. Alternatively, the solid state memory may be used as a cache where it offers faster access time than that offered by magnetic storage medium 178. In such a case, the solid state memory may be disposed between interface controller 120 and read channel circuit 110 where it operates as a pass through to magnetic storage medium 178 when requested data is not available in the solid state memory or when the solid state memory does not have sufficient storage to hold a newly written data set.

Figure 2A:
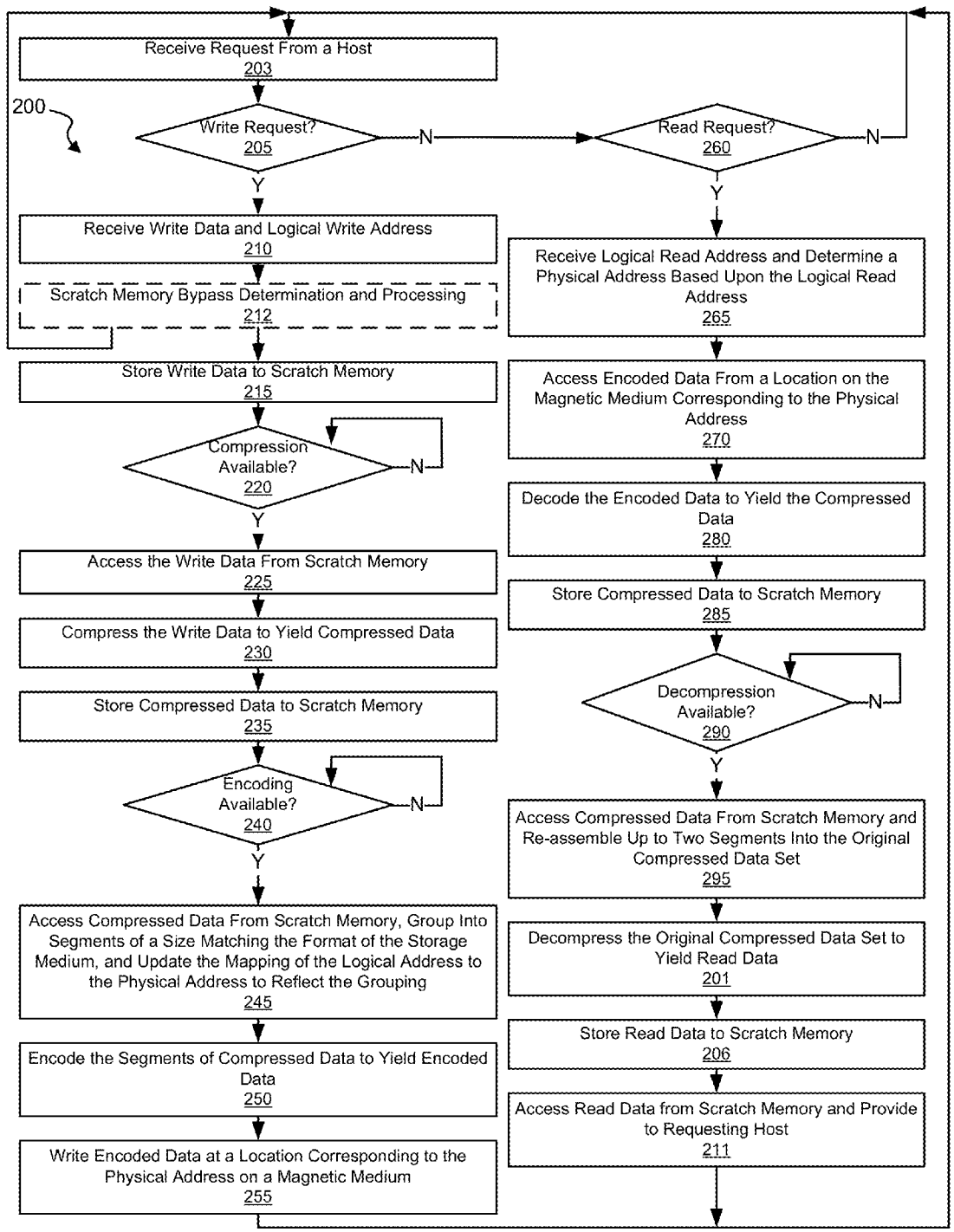
FIGS. 2a-2b are a flow diagram showing a method in accordance with one or more embodiments of the present invention for internally compressing/decompressing disk drive data relying on a scratch memory when available, and on a magnetic storage medium when the scratch memory is not available.
Figure 2B:
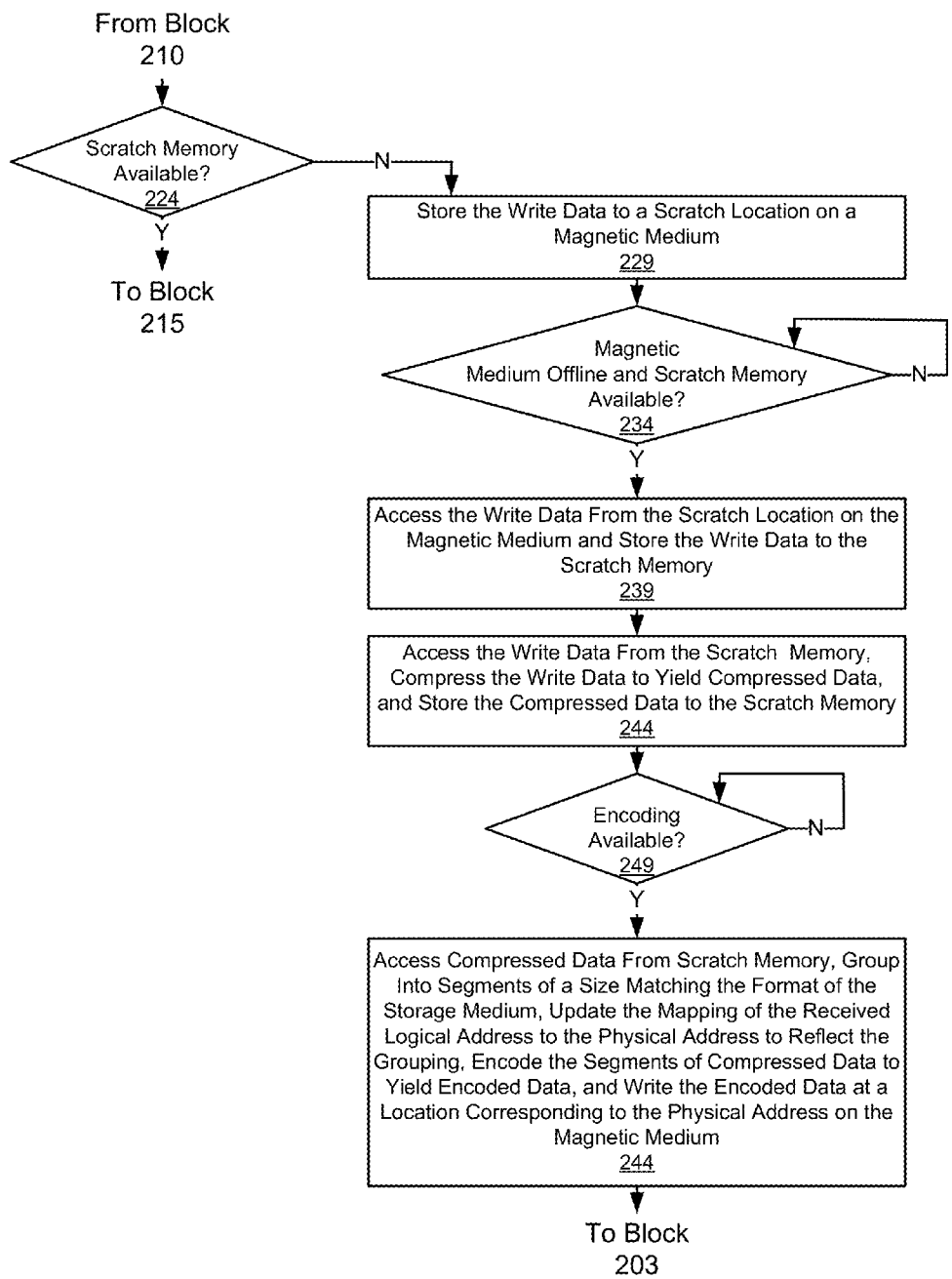

Turning to FIGS. 2a-2b, a flow diagram 200 shows a method in accordance with one or more embodiments of the present invention for internally compressing/decompressing disk drive data relying on a scratch memory when available, and on a magnetic storage medium when the scratch memory is not available. Following flow diagram 200, a request is received from a host (block 203). The host may be any device known in the art capable of requesting a read and/or write of data to/from a storage medium. As one example, the host may be a computer. It is determined whether the request is a write request (block 205). Where it is determined that the received request is a write request (block 205), write data and a corresponding logical write address are received (block 210).

Scratch memory bypass and processing is performed (block 212). Turning to FIG. 2b, detail of the processing of block 212 is shown. As shown in FIG. 2b, it is determined whether a scratch memory is available (block 224). The availability of the scratch memory is based upon whether the scratch memory has sufficient space to store the write data. Where the scratch memory is not available (block 224), the received write data is stored to a scratch location on a magnetic storage medium (block 229). It is determined whether the magnetic storage medium is offline (i.e., has a substantial time period where no access is expected) and the scratch memory is available (block 234). Where both the magnetic storage medium is offline and the scratch memory are available (block 234), the write data is accessed from the scratch location on the magnetic storage medium and stored to the scratch memory (block 239). Where the write data was encoded prior to the write to the scratch location of the magnetic storage medium, then the process of accessing the write data from the scratch location on the storage medium includes decoding the previously encoded data to yield the original write data.

This approach of using a scratch memory region on the magnetic storage medium as temporary holding area allows for a slow speed compression algorithm to be implemented. When there are few sectors to write, the data can be held in the scratch memory device until compression is complete. In contrast, when data writes are continuous, a slow rate compressor will not be able to compress the data in real time, and thus non-compressed data is stored temporarily to the scratch memory region on the magnetic storage medium until a slow down in the data writes allows for compression of the temporarily stored data. The media could be scratch media, or it could be the media that data are normally stored in.

The write data is then accessed from the scratch memory, and the compression circuit applies a data compression algorithm is applied to the retrieved data to yield compressed, and the compressed data is written back to the scratch memory (block 244). The data compression algorithm may be any compression algorithm known in the art.

It is determined whether an encoding circuit is available (i.e., is not busy)(block 249). Where an encoding circuit is not busy (block 249), the previously stored compressed data is accessed from the scratch memory (block 244). The accessed compressed data is grouped into segments of a size matching the format size of the storage medium to which the data is to be stored (e.g., 4 KB). At this juncture, the mapping of the logical address to the physical address is updated to reflect the grouping where the grouping affects the physical address on the storage medium to which the data is to be stored. An encoding algorithm is applied to the compressed data to yield encoded data, and the encoded data is written to a location on the magnetic storage medium corresponding to the write address. In some embodiments of the present invention, the data encoding circuit is a low density parity check encoding circuit. The process then returns to block 203 of FIG. 2a. Alternatively, where the scratch memory is available (block 224), the process is returned to block 215 of FIG. 2b.

Referring again to FIG. 2a, the write data is stored to the scratch memory (block 215). The logical write address is ultimately mapped or linked to a physical address on the storage medium where the received data is accessible. A hard disk controller maintains a table linking the logical address to the physical address. In some embodiments of the present invention, the scratch memory is a solid state memory device. In one particular case, the scratch memory is a DDR SDRAM.

It is then determined whether a compression circuit is available (i.e., is not busy) (block 220). Where the compression circuit is available (block 220), the write data previously stored to the scratch memory is accessed from the scratch memory (block 225), and a data compression algorithm is applied to the retrieved data to yield compressed data (block 230). The data compression algorithm may be any compression algorithm known in the art. The resulting compressed data is stored back to the scratch memory (block 235).

It is determined whether an encoding circuit is available (i.e., is not busy)(block 240). Where an encoding circuit is not busy (block 240), the previously stored compressed data is accessed from the scratch memory (block 245). The accessed compressed data is grouped into segments of a size matching the format size of the storage medium to which the data is to be stored (e.g., 4 KB). At this juncture, the mapping of the logical address to the physical address is updated to reflect the grouping where the grouping affects the physical address on the storage medium to which the data is to be stored. An encoding algorithm is applied to the segments of compressed data to yield encoded data set(s) (block 250). In some embodiments of the present invention, the data encoding circuit is a low density parity check encoding circuit. The encoded data is then written to a magnetic storage medium at a physical location that corresponds to the original logical write address (block 255). In some embodiments of the present invention, the magnetic storage medium is a disk platter of a hard disk drive.

Alternatively, where it is determined that the received request is not a write request (block 205), it is determined whether the received request is a read request (block 260). Where it is determined that the received request is a read request (block 260), a logical read address from which data is to be read is received (block 265). This logical read address is mapped to a physical address corresponding to a location on the storage medium where the requested data was stored. This conversion from the logical read address to the physical address is done using a table linking logical addresses to physical addresses that was updated at the time the data was stored to the storage medium (see e.g., block 245). Encoded data is accessed from a location on the magnetic storage medium corresponding to the physical address (block 270). The encoded data is then decoded by a decoding circuit to yield compressed data (block 280). The data decoding circuit may include a low density parity check decoding circuit. The resulting compressed data is stored to the scratch memory (block 285).

It is then determined whether a decompression circuit is available (i.e., is not busy) (block 290). Where the decompression circuit is available (block 290), the compressed data previously stored to the scratch memory is accessed from the scratch memory (block 295). This process includes re-assembling the original compressed data that existed prior to the grouping performed in block 245. A data decompression algorithm is applied to the retrieved data to yield read data (block 201). The data decompression algorithm essentially reverses the compression applied by the data compression algorithm, and may be any decompression algorithm known in the art. The resulting read data is stored back to the scratch memory (block 206). Ultimately, the read data is accessed from the scratch memory and provided to the requesting host (block 211).

To collect garbage (sectors that are moved/removed or deleted), and to compress the non-compressed data written to the disk due to throughput reason, defragmentation and garbage collection are routinely operated to read compressed and non-compressed data, compress data that are still valid and re-write them into the disk. In this process, the LBA→PBA table needs to be updated/maintained.

Figure 3:
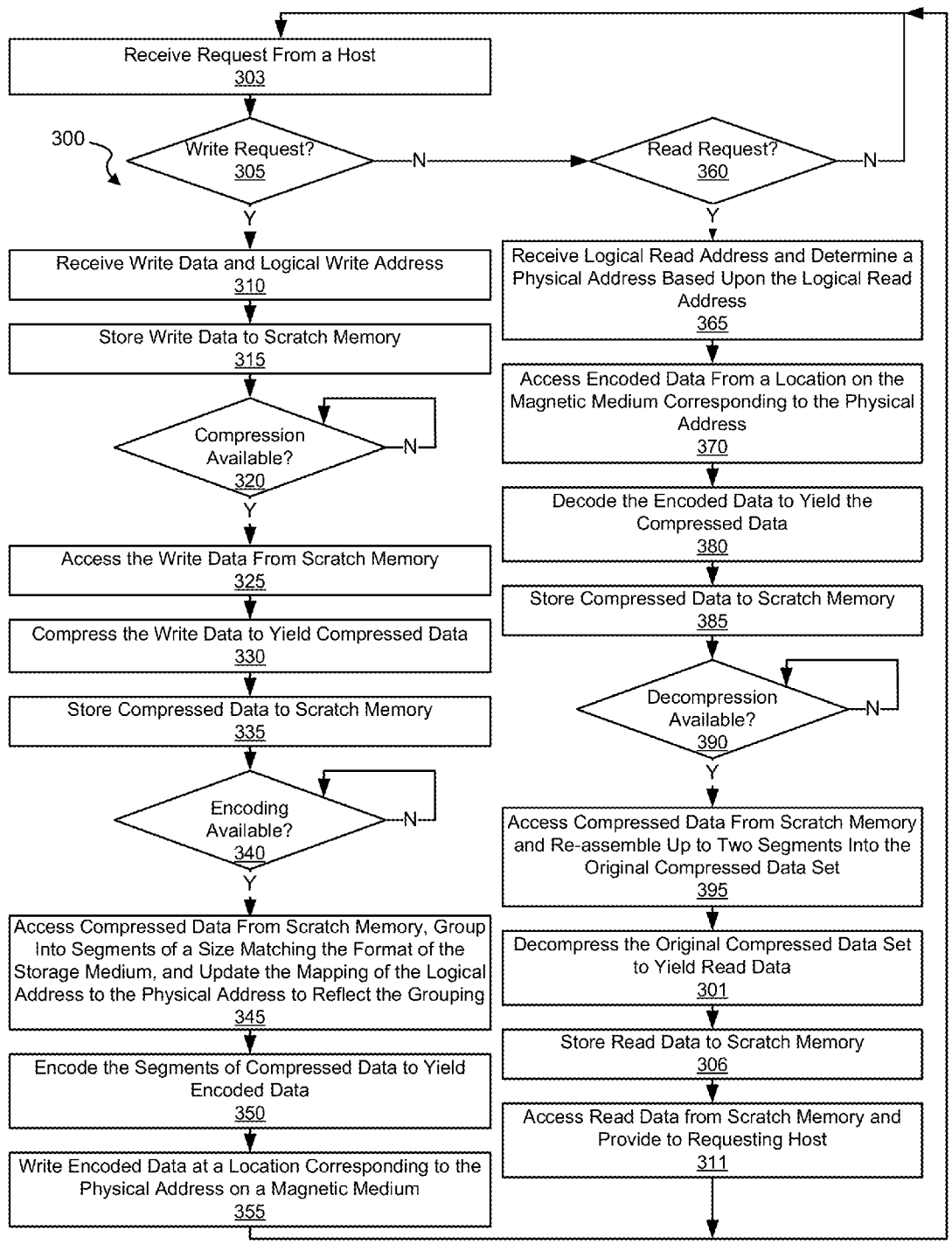
FIG. 3 is a flow diagram showing a method in accordance with some embodiments of the present invention for internally compressing/decompressing disk drive data relying on a scratch memory.

Turning to FIG. 3, a flow diagram 300 shows a method in accordance with some embodiments of the present invention for internally compressing/decompressing disk drive data relying on a scratch memory. Following flow diagram 300, a request is received from a host (block 303). The host may be any device known in the art capable of requesting a read and/or write of data to/from a storage medium. As one example, the host may be a computer. It is determined whether the request is a write request (block 305). Where it is determined that the received request is a write request (block 305), write data and a corresponding logical write address are received (block 310), and stored to a scratch memory (block 315). The logical write address is ultimately mapped or linked to a physical address on the storage medium where the received data is accessible. A hard disk controller maintains a table linking the logical address to the physical address. In some embodiments of the present invention, the scratch memory is a solid state memory device. In one particular case, the scratch memory is a DDR SDRAM.

It is then determined whether a compression circuit is available (i.e., is not busy) (block 320). Where the compression circuit is available (block 320), the write data previously stored to the scratch memory is accessed from the scratch memory (block 325), and a data compression algorithm is applied to the retrieved data to yield compressed data (block 330). The data compression algorithm may be any compression algorithm known in the art. The resulting compressed data is stored back to the scratch memory (block 335).

It is determined whether an encoding circuit is available (i.e., is not busy)(block 340). Where an encoding circuit is not busy (block 340), the previously stored compressed data is accessed from the scratch memory (block 345). The accessed compressed data is grouped into segments of a size matching the format size of the storage medium to which the data is to be stored (e.g., 4 KB). At this juncture, the mapping of the logical address to the physical address is updated to reflect the grouping where the grouping affects the physical address on the storage medium to which the data is to be stored. An encoding algorithm is applied to the segments of compressed data to yield encoded data set(s) (block 350). In some embodiments of the present invention, the data encoding circuit is a low density parity check encoding circuit. The encoded data is then written to a magnetic storage medium at a physical location that corresponds to the original logical write address (block 355). In some embodiments of the present invention, the magnetic storage medium is a disk platter of a hard disk drive.

Alternatively, where it is determined that the received request is not a write request (block 305), it is determined whether the received request is a read request (block 360). Where it is determined that the received request is a read request (block 360), a logical read address from which data is to be read is received (block 365). This logical read address is mapped to a physical address corresponding to a location on the storage medium where the requested data was stored. This conversion from the logical read address to the physical address is done using a table linking logical addresses to physical addresses that was updated at the time the data was stored to the storage medium (see e.g., block 345). Encoded data is accessed from a location on the magnetic storage medium corresponding to the physical address (block 370). The encoded data is then decoded by a decoding circuit to yield compressed data (block 380). The data decoding circuit may include a low density parity check decoding circuit. The resulting compressed data is stored to the scratch memory (block 385).

It is then determined whether a decompression circuit is available (i.e., is not busy) (block 390). Where the decompression circuit is available (block 390), the compressed data previously stored to the scratch memory is accessed from the scratch memory (block 395). This process includes re-assembling the original compressed data that existed prior to the grouping performed in block 345. A data decompression algorithm is applied to the retrieved data to yield read data (block 301). The data decompression algorithm essentially reverses the compression applied by the data compression algorithm, and may be any decompression algorithm known in the art. The resulting read data is stored back to the scratch memory (block 306). Ultimately, the read data is accessed from the scratch memory and provided to the requesting host (block 311).

In some cases, the decompression may be done on the host side. In such a case, block 306 would be replaced by a process that sends the read data directly to the host, and block 311 is eliminated.

Figure 4:
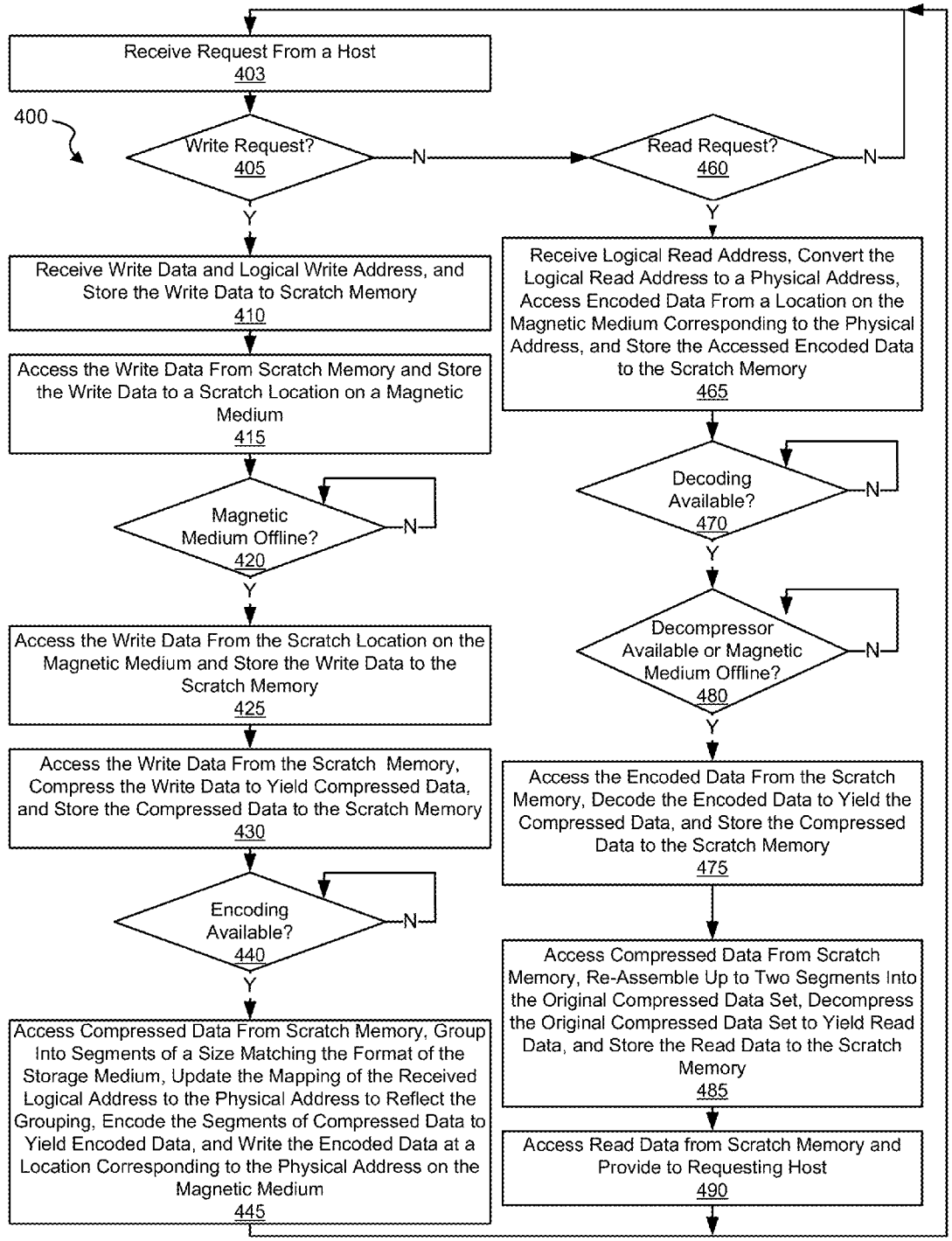
FIG. 4 is a flow diagram showing a method in accordance with some embodiments of the present invention for internally compressing/decompressing disk drive data relying on both a scratch memory and a magnetic storage medium.

Turning to FIG. 4, a flow diagram 400 shows a method in accordance with some embodiments of the present invention for internally compressing/decompressing disk drive data relying on both a scratch memory and a magnetic storage medium. Following flow diagram 400, a request is received from a host (block 403). The host may be any device known in the art capable of requesting a read and/or write of data to/from a storage medium. As one example, the host may be a computer. It is determined whether the request is a write request (block 405). Where it is determined that the received request is a write request (block 405), write data and a corresponding logical write address are received, and stored to a scratch memory (block 410). In some embodiments of the present invention, the scratch memory is a solid state memory device. In one particular case, the scratch memory is a DDR SDRAM.

The previously stored write data is accessed from the scratch memory and stored to a scratch location on a magnetic storage medium (block 415). This process of storing to the magnetic storage medium may include encoding uncompressed write data, and writing the encoded, uncompressed write data to the magnetic storage medium. In some embodiments of the present invention, the magnetic storage medium is a disk platter of a hard disk drive.

It is determined whether the magnetic storage medium is offline (i.e., has a substantial time period where no access is expected) (block 420). Where the magnetic storage medium is offline (block 420), the write data is accessed from the scratch location on the magnetic storage medium, and stored to the scratch memory (block 425). Where the write data was encoded prior to the write to the scratch location of the magnetic storage medium, then the process of accessing the write data from the scratch location on the storage medium includes decoding the previously encoded data to yield the original write data.

The write data is then accessed from the scratch memory, and the compression circuit applies a data compression algorithm is applied to the retrieved data to yield compressed, and the compressed data is written back to the scratch memory (block 430). The data compression algorithm may be any compression algorithm known in the art.

It is determined whether an encoding circuit is available (i.e., is not busy)(block 440). Where an encoding circuit is not busy (block 440), the previously stored compressed data is accessed from the scratch memory (block 445). The accessed compressed data is grouped into segments of a size matching the format size of the storage medium to which the data is to be stored (e.g., 4 KB). At this juncture, the mapping of the logical address to the physical address is updated to reflect the grouping where the grouping affects the physical address on the storage medium to which the data is to be stored. An encoding algorithm is applied to the compressed data to yield encoded data, and the encoded data is written to a location on the magnetic storage medium corresponding to the write address. In some embodiments of the present invention, the data encoding circuit is a low density parity check encoding circuit.

Alternatively, where it is determined that the received request is not a write request (block 405), it is determined whether the received request is a read request (block 460). Where it is determined that the received request is a read request (block 460), a logical address from which data is to be read is received (block 465). and encoded data corresponding to the received address is accessed from the magnetic storage medium, and the encoded data is stored to the scratch memory (block 465). This logical read address is mapped to a physical address corresponding to a location on the storage medium where the requested data was stored. This conversion from the logical read address to the physical address is done using a table linking logical addresses to physical addresses that was updated at the time the data was stored to the storage medium (see e.g., block 445). Encoded data is accessed from a location on the magnetic storage medium corresponding to the physical address, and the accessed, encoded data is stored to the scratch memory.

It is determined whether a decoding circuit is available (block 470). Where a decoding circuit is available (block 470), it is then determined whether the magnetic storage medium is offline (i.e., has a substantial time period where no access is expected) or if a data de-compressor circuit is available (block 480). Where either is true (block 480), the encoded data is accessed from the scratch memory, and the decoding circuit applies a data decoding algorithm to the encoded data to yield compressed data which is stored back to the scratch memory (block 475). The data decoding circuit may include a low density parity check decoding circuit. The compressed data is then accessed from the scratch memory (block 485). This process includes re-assembling the original compressed data set that existed prior to the grouping performed in block 445. A data decompression algorithm is applied to the original compressed data set to yield read data. The data decompression algorithm essentially reverses the compression applied by the data compression algorithm, and may be any decompression algorithm known in the art. The resulting read data is stored back to the scratch memory. Ultimately, the read data is accessed from the scratch memory and provided to the requesting host (block 490).

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data storage. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for storing data in a hard disk drive, the method comprising:
   providing a magnetic storage medium;
   receiving a received write data set;
   storing the received write data set to the magnetic storage medium as a stored write data set;
   determining that the magnetic storage medium is offline;
   when the storage medium is offline, accessing the stored write data set from the magnetic storage medium as an accessed write data set;
   applying a compression algorithm to the accessed write data set to yield a compressed data set;
   encoding the compressed data set in accordance with an encoding algorithm to yield an encoded data set; and
   storing the encoded data set to the magnetic storage medium.

2. The method of claim 1, wherein the magnetic storage medium is a disk platter of a hard disk drive.

3. The method of claim 1, wherein the method further comprises:
receiving a write command from a host device, wherein the write command includes the write data set.

4. The method of claim 3, wherein the host device is a computer.

5. The method of claim 1, wherein the encoding algorithm is a low density parity check encoding algorithm.

6. A system, the system comprising:
a host interface circuit configured to receive a write command from a host device, wherein the write command includes a write data set;
a write circuit configured to write the write data set in an uncompressed form as an uncompressed data set to a disk platter;
a read circuit configured to:
determine that the disk platter is offline; and
read the uncompressed data set from the disk platter when the disk platter is offline;
a compression circuit configured to compress the uncompressed data to yield a compressed data set;
an encoding circuit configured to apply an encoding algorithm to the compressed data set to yield an encoded data set; and
wherein the write circuit is further configured to write the encoded data set to the disk platter.

7. The system of claim 6, wherein the system is implemented on a single semiconductor device, and wherein the compression circuit is configured to compress the write data set prior to encoding by the semiconductor device to yield the compressed data set.

8. The system of claim 6, wherein the system further comprises:
the disk platter.

9. The system of claim 6, wherein the encoding circuit is further configured to encode the write data set to yield the uncompressed data set.

10. The system of claim 9, the system further comprising:
a decoding circuit configured to decode the uncompressed data set received from the read circuit prior to compression by the compression circuit.

11. The method of claim 1, wherein storing the received write data set to the magnetic storage medium as the stored write data set includes encoding the stored write data set prior to writing to the magnetic storage medium, and wherein accessing the stored write data set from the magnetic storage medium as the accessed write data set includes decoding data from the magnetic storage medium to yield the accessed write data set.

12. A storage device, the storage device comprising:
a magnetic storage medium;
a semiconductor device including:
a host interface circuit configured to receive a write command from a host device, wherein the write command includes a write data set;
a write circuit configured to write the write data set in an uncompressed form as an uncompressed data set to the magnetic storage medium;
a read circuit configured to:
determine that the magnetic storage medium is offline; and
read the uncompressed data set from the magnetic storage medium when the magnetic storage medium is offline;
a compression circuit configured to compress the uncompressed data set to yield a compressed data set;
an encoding circuit configured to apply an encoding algorithm to the compressed data set to yield an encoded data set; and
wherein the write circuit is further configured to write the encoded data set to the magnetic storage medium.

13. The storage device of claim 12, wherein the magnetic storage medium is a disk platter.

14. The storage device of claim 12, wherein the encoding circuit is further configured to encode the write data set to yield the uncompressed data set.

15. The system of claim 6, wherein the encoding algorithm is a low density parity check encoding algorithm.

16. The system of claim 6, wherein the system further comprises the host device.

17. The system of claim 16, wherein the host device is a computer.

18. The system of claim 6, wherein the host interface circuit is further configured to receive a read command from the host device.

* * * * *